US012748125B2

(12) United States Patent
Lin et al.

(10) Patent No.: US 12,748,125 B2

(45) Date of Patent: Sep. 29, 2026

(54) ROTATIONAL SPEED ESTIMATION METHOD FOR INCREMENTAL ENCODER

(71) Applicant: Artery Technology Company, Hsinchu City (TW)

(72) Inventors: Ming-Tsan Lin, Keelung City (TW); Yi-Shiang Ouyang, Miaoli County (TW); Zi-Xuan Huang, Nantou County (TW)

(73) Assignee: ARTERY TECHNOLOGY COMPANY, Hsinchu City (TW)

( * ) Notice: Subject to any disclaimer, the term of this patent is extended or adjusted under 35 U.S.C. 154(b) by 407 days.

(21) Appl. No.: 18/522,036

(22) Filed: Nov. 28, 2023

(65) Prior Publication Data

US 2024/0418741 A1 Dec. 19, 2024

(30) Foreign Application Priority Data

Jun. 13, 2023 (TW) ................................ 112121917

(51) Int. Cl.

*G01P 3/68* (2006.01)
*G01D 5/347* (2006.01)
*G01D 5/36* (2006.01)
*G01P 3/36* (2006.01)
*G01P 3/481* (2006.01)
*G01P 3/489* (2006.01)

(52) U.S. Cl.

CPC .............. *G01P 3/68* (2013.01); *G01D 5/3473* (2013.01); *G01D 5/366* (2013.01); *G01D 5/34707* (2013.01); *G01D 2205/20* (2021.05); *G01P 3/36* (2013.01); *G01P 3/481* (2013.01); *G01P 3/489* (2013.01)

(58) Field of Classification Search

USPC .......................................................... 702/145

See application file for complete search history.

(56) References Cited

U.S. PATENT DOCUMENTS

| | | | | |
|---|---|---|---|---|
| 2005/0231191 A1* | 10/2005 | Tsuji | F02P 7/077 | |
| | | | 324/164 | |
| 2010/0072938 A1* | 3/2010 | Reichert | G02B 26/122 | |
| | | | 250/231.13 | |
| 2011/0057822 A1* | 3/2011 | Watahiki | G01D 5/36 | |
| | | | 250/231.13 | |
| 2017/0038755 A1* | 2/2017 | Kim | G05B 19/056 | |
| 2018/0188282 A1* | 7/2018 | Xiong | G01P 3/481 | |
| 2023/0048463 A1* | 2/2023 | Ueno | G01B 11/26 | |

FOREIGN PATENT DOCUMENTS

CN 113739828 A 12/2021

OTHER PUBLICATIONS

English translation of CN113739828.

* cited by examiner

*Primary Examiner* — Paul D Lee

(74) *Attorney, Agent, or Firm* — WPAT, P.C.; Anthony King

(57) ABSTRACT

A rotational speed estimation method for an incremental encoder includes generating a plurality of pulse signals according to a plurality of square waves, detecting a time duration when the pulse signals reach a predetermined amount, and generating a rotational speed of a disc according to the predetermined amount, the time duration, and the total number of pulses corresponding to one rotation of the disc of the incremental encoder.

10 Claims, 7 Drawing Sheets

ROTATIONAL SPEED ESTIMATION METHOD FOR INCREMENTAL ENCODER

BACKGROUND OF THE INVENTION

1. Field of the Invention

The invention is related to an incremental encoder, in particular, to a method for estimating a rotational speed of an incremental encoder.

2. Description of the Prior Art

Rotational encoders can be classified into two categories: absolute and incremental. The absolute type provides the absolute position (angle) of the rotating shaft, while the incremental type only outputs the relative position (angle) of the rotating shaft. Regardless of the type, both the absolute and incremental encoders can deliver information such as revolutions per minute (rpm) and rotation angle via certain devices or sensors.

There are two methods for estimating speed in incremental encoders: M-mode and T-mode. The M-mode estimation involves counting the number of the encoder pulses $P_r$ in a fixed sampling time period Ts, combining the number of the encoder pulses $P_r$ with the total number of pulses $P_T$ in one disc cycle, and then computing the rotational speed using the equation $$\omega = \frac{60 \times P_r}{Ts \times P_T} \text{ rpm.}$$

While this approach works well for measuring high speeds, it's not the best fit for low-speed measurements.

The T-mode estimation calculates the time duration Tr of encoder pulses, and subsequently calculates the rotational speed using the equation $$\omega = \frac{60}{Tr \times P_T} \text{ rpm.}$$

This technique is well-suited for measuring low speeds, but falls short when it comes to high-speed measurements.

Presently, there is no technology available that can accurately estimate the rotational speed of an incremental encoder at both low and high rotational speeds.

SUMMARY OF THE INVENTION

An embodiment provides a rotational speed estimation method for an incremental encoder including generating a plurality of pulse signals according to a plurality of square waves, detecting a time duration when the pulse signals reach a predetermined number, and generating a rotational speed of the incremental encoder according to the predetermined number, the time duration and a total pulse number of one rotation of a disc of the incremental encoder.

Another embodiment provides a rotational speed estimation method for an incremental encoder including generating a plurality of pulse signals according to a plurality of square waves, detecting that the pulse signals reach a predetermined number of pulse time durations, and generating a rotational speed of the incremental encoder according to the predetermined number, a sum of the pulse time durations and a total number of pulses for one rotation of a disc of the incremental encoder.

These and other objectives of the present invention will no doubt become obvious to those of ordinary skill in the art after reading the following detailed description of the preferred embodiment that is illustrated in the various figures and drawings.

DETAILED DESCRIPTION

Encoders can be classified into three types based on the principle of signal generation: mechanical, magnetic and optical. The optical type encoder, in particular, has a disc that spins in synchronization with the main shaft, and is sandwiched between light sources and light sensors. The disc has alternating transparent and opaque regions, enabling the light sensors to generate data for a microprocessor to determine the number of rotations of the disc.

The encoders can be classified into absolute encoders and incremental encoders based on the encoding methods. An incremental encoder operates by using a first signal A and a second signal B that have a 90-degree phase difference therebetween, resulting in four combinations at output terminals. The four combinations of the first signal A and the second signal B are (0, 0), (0, 1), (1, 1), (1, 0) respectively, enabling the high and low levels of the first signal A and the second signal B to be converted into pulses that correspond to the number of rotations of the disc. Assuming that a rotation of the disc corresponds to 600 pulses, then the disc performs 1/600 rotation when the first signal A and the second signal B changes from (0,0) to (0,1).

Figure 1:
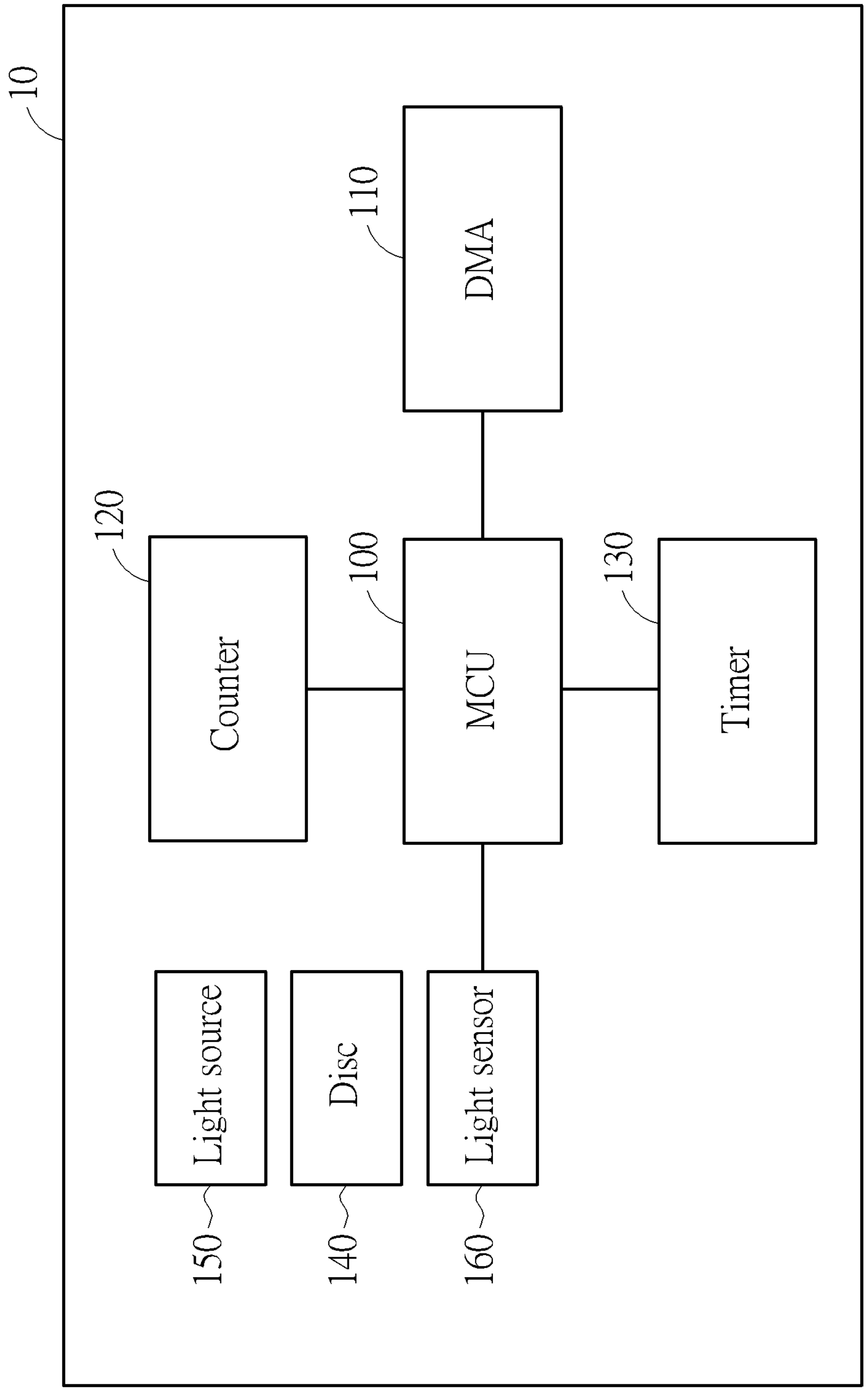
FIG. 1 is a block diagram of an incremental encoder according to the present invention.

An embodiment of the invention presents a method for estimating the rotational speed of an incremental encoder. FIG. 1 is a block diagram of an incremental encoder 10 according to the present invention. The incremental encoder 10 includes a microprocessor 100, a direct memory access (DMA) 110, a counter 120, a timer 130, a disc 140, a light source 150, and a light sensor 160. The microprocessor 100 may control the counter 120, the timer 130, and access the DMA 110 at an appropriate time. The light from the light source 150 passes through the transparent regions on the disc 140 to reach the light sensor 160, and the light sensor 160 outputs corresponding square wave signals to the microprocessor 100. The microprocessor 100 then converts the rising and falling edges of the square wave signals into pulse signals. While the figures in the disclosure are based on an optical encoder, the application is not limited thereto and can be extended to mechanical, magnetic, or optical incremental encoders.

Figure 2:
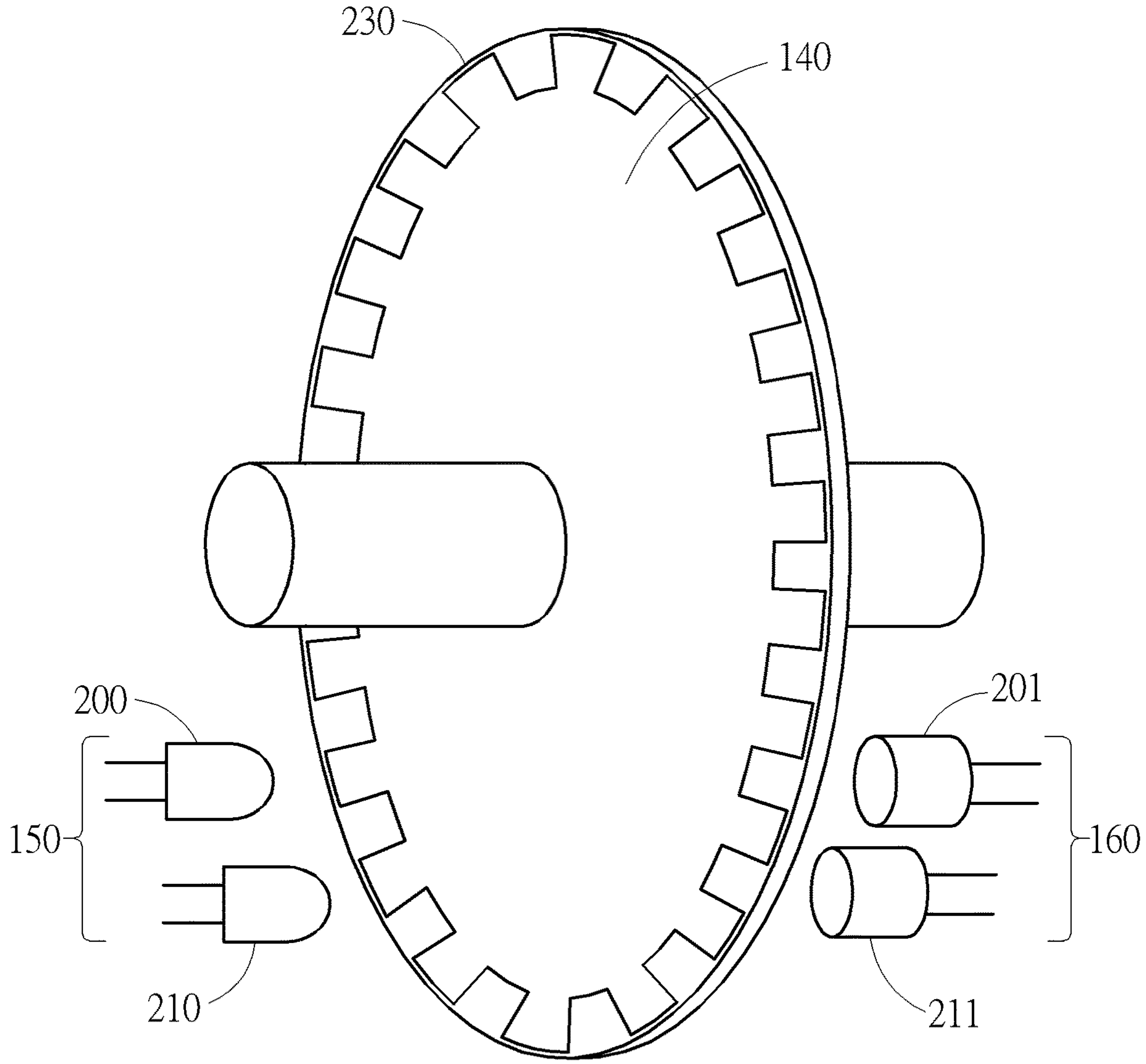
FIG. 2 is a schematic diagram of a disc, the light source and the light sensor in FIG. 1.

FIG. 2 is a schematic diagram of the disc 140, the light source 150 and the light sensor 160. In an embodiment, the microprocessor 100 can generate pulse signals using the setup shown in FIG. 2. The disc 140 has a plurality of recesses 230. The light source 150 can include a plurality of light emitting diodes 200, 210 positioned on one side of the disc 140, and the light sensor 160 can include a plurality of light sensing elements 201, 211 positioned on the opposite side of the disc 140. The light emitting diodes 200 and 210 can continuously emit light, and the light sensing elements 201 and 211 can continuously detect the light emitted by the corresponding light emitting diodes 200 and 210. When the disc 140 rotates and the light emitted by the light emitting diode 200 passes through a recess 230, the light sensing element 201 can detect the light transmitted from the light emitting diode 200. When there is no recess 230 between the light sensing element 201 and the light emitting diode 200, the light sensing element 201 cannot detect the light transmitted from the light emitting diode 200, thus the light sensing element 201 can generate the first signal A with a square wave. Likewise, when the disc 140 rotates and the light emitted by the light emitting diode 210 passes through a recess 230, the light sensing element 211 can detect the light transmitted from the light emitting diode 210. When there is no recess 230 between the light sensing elements 211 and the light emitting diode 210, the light sensing element 211 cannot detect the light transmitted from the light emitting diode 210, thus the light sensing element 211 can generate the second signal B with a square wave. By properly arranging the light emitting diodes 200, 210 and the light sensing elements 201, 211, the phase difference between the first signal A and the second signal B can be substantially 90 degrees.

Figure 3:
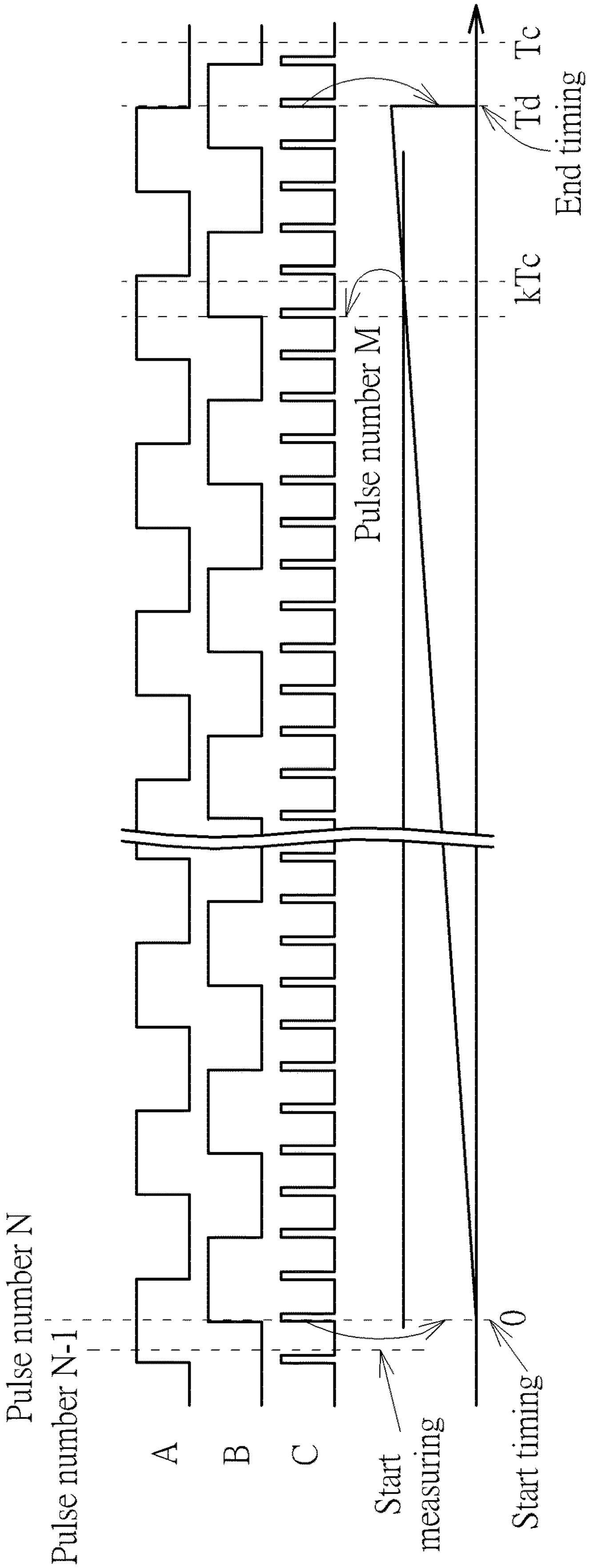
FIG. 3 is a waveform diagram of a plurality of pulse signals generated according to a first signal and a second signal outputted by the light sensor in FIG. 2.

FIG. 3 is a waveform diagram of a plurality of pulse signals generated according to the first signal A and the second signal B. As shown in FIG. 3, since the phase difference between the first signal A and the second signal B is 90 degrees, a quadrupled frequency pulse signal C can be generated, and the number of the quadrupled frequency pulse signal C can be calculated by a counter 120.

When the microprocessor 100 measures the rotational speed of the disc 140, and the current pulse number recorded by the counter 120 is N−1, the current pulse number N−1 is stored into the DMA 110 or another memory. When the rising edge or falling edge of the first signal A or the second signal B generates the Nth pulse, the timer 130 starts to time a cycle Tc. A constant k ranging between 0.5 and 1.0 (e.g., k=0.8) is stored in the microprocessor 100. When the timer 130 starts timing, the time is reset to 0. When the time reaches kTc, the number of pulses recorded by the counter 120 is M, and the microprocessor 100 can instruct the timer 130 to stop timing when the number of pulses reaches the predetermined number of pulses $$P_r = N + \frac{M - N - 1}{k}.$$

Upon the timer 130 stopping the timing, the time recorded by the timer 130 is the end time Td, and the microprocessor 100 can use the end time Td, the total number of pulses $P_T$ for one turn of the disc 140, the number of pulses N, and the predetermined number of pulses $P_r$ to generate the rotational speed $$\omega = \frac{60 \times (P_r - N - 1)}{Td \times P_T} \text{ rpm}$$

of the disc 140.

In another embodiment of the present invention, suppose the microprocessor 100 sequentially calculates the rotational speeds of the disc 140 as $\omega_1, \omega_2, \ldots, \omega_n$, if the slope of $\omega_1, \omega_2, \ldots, \omega_n$ obtained by linear regression $$\frac{\sum_{i=1}^{n}\left(i - \frac{1+n}{2}\right)(\omega_i - \overline{\omega})}{\sum_{i=1}^{n}\left(i - \frac{1+n}{2}\right)^2}$$

is a negative value, then the disc is decelerating, where $\overline{\omega}$ is the average value of $\omega_1, \omega_2, \ldots, \omega_n$. When the microprocessor 100 measures the rotational speed of the disc 140, and the current pulse number recorded by the counter 120 is N−1, the current pulse number N−1 is stored into the DMA 110 or another memory. When the rising edge or falling edge of the first signal A or the second signal B generates the Nth pulse, the timer 130 starts to time a cycle Tc. A constant k ranging between 0.5 and 1.0 (e.g., k=0.8) and a constant p compensating for the deviation of the deceleration of the disc 140 are stored in the microprocessor 100. When the timer 130 starts timing, the time can be reset to 0. When the time reaches kTc, the number of pulses recorded by the counter 120 is M, and the microprocessor 100 can instruct the timer 130 to stop timing when the number of pulses reaches the predetermined number of pulses $$P_r = N + \frac{M - N - 1}{k} - p.$$

When the timer 130 stops timing, the time recorded by the timer 130 is the end time Td, and the microprocessor 100 can use the end time Td, the total pulse number $P_T$ for one turn of the disc 140, the pulse number N, and the predetermined pulse number $P_r$ to generate the rotational speed $$\omega = \frac{60 \times (P_r - N - 1)}{Td \times P_T} \text{ rpm}$$

of the disc 140.

In another embodiment of the present invention, a method for estimating the rotational speed of an incremental encoder is provided. When the microprocessor 100 measures the rotational speed of the disc 140, and the current pulse number recorded by the counter 120 is N−1, the current pulse number N−1 is stored into the DMA 110 or another memory. When the rising edge or falling edge of the first signal A or the second signal B generates the Nth pulse, the timer 130 starts to time a cycle Tc, and the starting time Ta is stored into the DMA 110 or another memory. A constant k ranging between 0.5 and 1.0 (e.g., k=0.8) is stored in the microprocessor 100. When the time reaches kTc, the number of pulses recorded by the counter 120 is M, and the DMA 110 may record the end time Tb of the timer 130 in the memory when the number of pulses reaches the predetermined number of pulses $$P_r = N + \frac{M - N - 1}{k}.$$

The microprocessor 100 can generate an elapsed time duration Td=Tb−Ta according to the start time Ta and the end time Tb. The microprocessor 100 can use the elapsed time duration Td, the total pulse number $P_T$ for one turn of the disc 140, the pulse number N, and the predetermined pulse number $P_r$ to generate the rotational speed $$\omega = \frac{60 \times (P_r - N - 1)}{Td \times P_T} \text{ rpm}$$

of the disc 140.

In another embodiment of the present invention, suppose the microprocessor 100 sequentially calculates the rotational speeds of the runner 140 as $\omega_1, \omega_2, \ldots, \omega_n$, if the slope of $\omega_1, \omega_2, \ldots, \omega_n$ obtained by linear regression $$\frac{\sum_{i=1}^{n}\left(i - \frac{1+n}{2}\right)(\omega_i - \overline{\omega})}{\sum_{i=1}^{n}\left(i - \frac{1+n}{2}\right)^2}$$

is a negative value, then the disc is decelerating, where $\overline{\omega}$ is the average value of $\omega_1, \omega_2, \ldots, \omega_n$. When the microprocessor 100 measures the rotational speed of the disc 140, and the current pulse number recorded by the counter 120 is N−1, the current pulse number N−1 is stored into the DMA 110 or another memory. When the rising edge or falling edge of the first signal A or the second signal B generates the Nth pulse, the timer 130 starts to time a cycle Tc, and the starting time Ta is stored into the DMA 110 or another memory. A constant k ranging between 0.5 and 1.0 (e.g., k=0.8) and a constant p compensating for the deviation of the deceleration of the disc 140 are stored in the microprocessor 100. When the time reaches kTc, the number of pulses recorded by the counter 120 is M, and the DMA 110 may record the end time Tb of the timer 130 in the memory when the number of pulses reaches the predetermined number of pulses $$P_r = N + \frac{M - N - 1}{k} - p.$$

The microprocessor 100 can generate an elapsed time duration Td=Tb−Ta according to the start time Ta and the end time Tb. The microprocessor 100 can use the elapsed time duration Td, the total pulse number $P_T$ for one turn of the disc 140, the pulse number N, and the predetermined pulse number $P_r$ to generate the rotational speed $$\omega = \frac{60 \times (P_r - N - 1)}{Td \times P_T} \text{ rpm}$$

of the disc 140.

Figure 4:
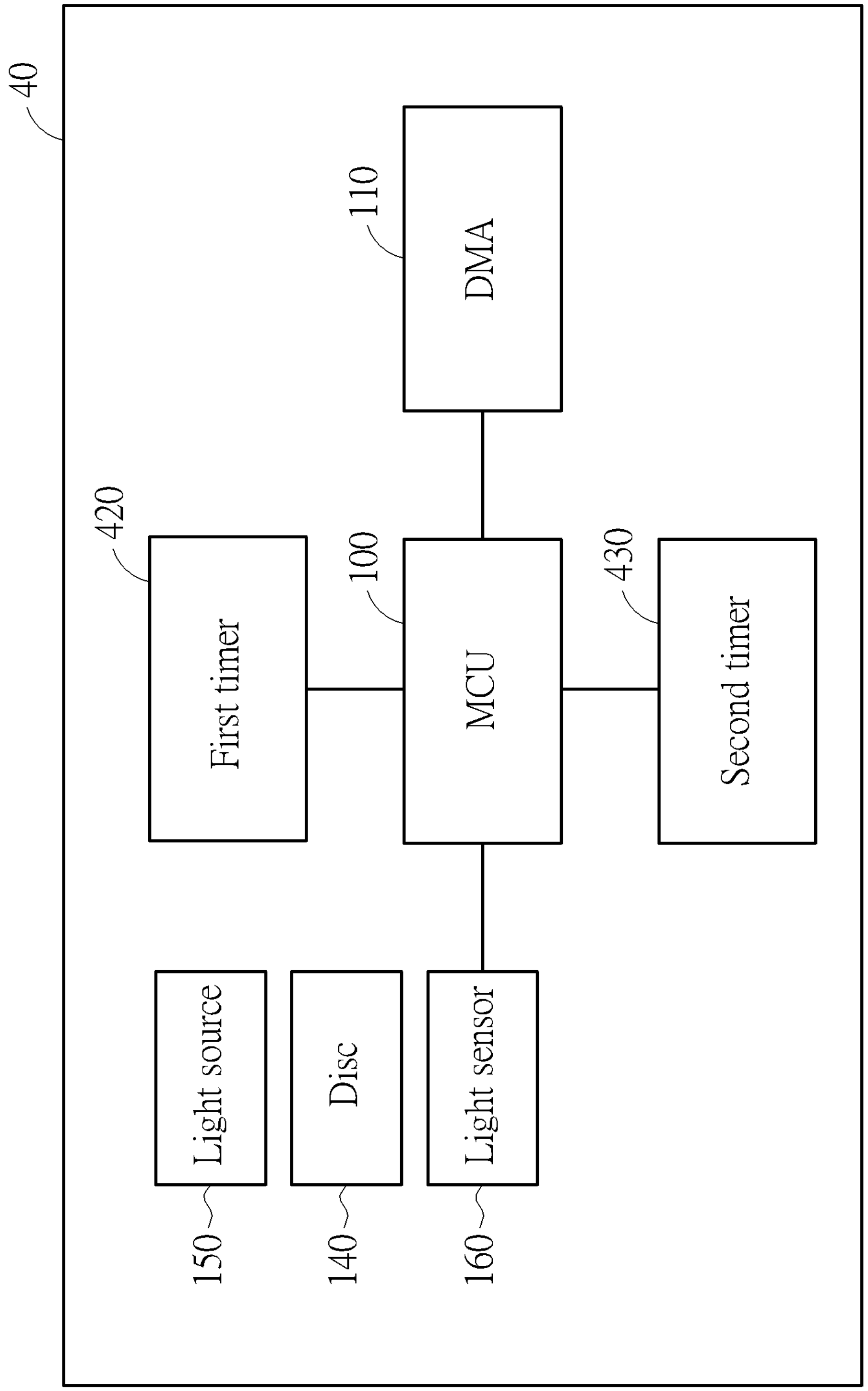
FIG. 4 is a block diagram of another incremental encoder.

In yet another embodiment, the invention presents a method for estimating the rotational speed of an incremental encoder. FIG. 4 is a block diagram of an incremental encoder 40. The incremental encoder 40 includes a microprocessor 100, a direct memory access (DMA) 110, a first timer 420, a second timer 430, a disc 140, a light source 150 and a light sensor 160. The microprocessor 100 is used to control the first timer 420, the second timer 430, and access the DMA 110 at the appropriate time. The light emitted by the light source 150 is transmitted to the light sensor 160 through the transparent region on the rotating disc 140. The light sensor 160 outputs a binary light sensing signal to the microprocessor 100, and the microprocessor 100 then converts the binary light sensing signal into a pulse signal.

Figure 5:
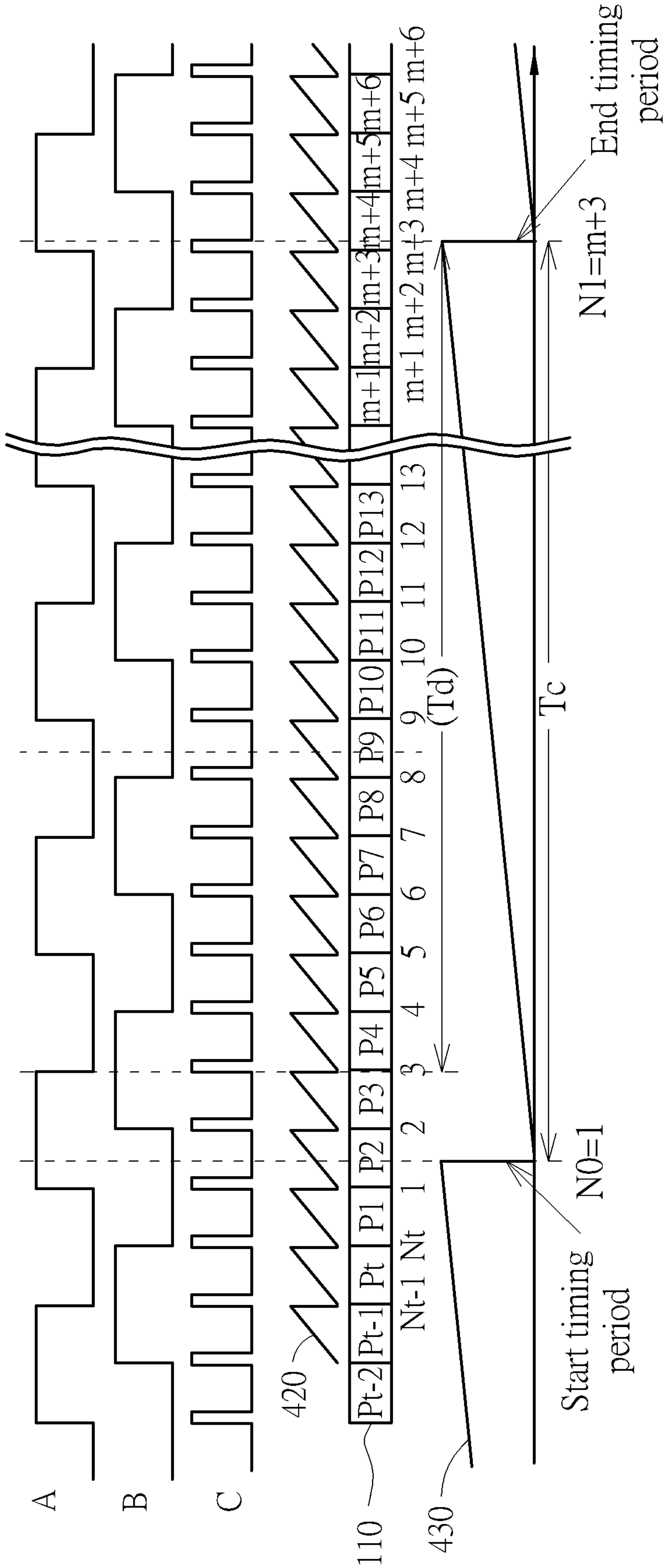
FIG. 5 shows waveforms generated according to a first signal and a second signal outputted by the light sensor in FIG. 4.

FIG. 5 shows waveforms generated according to the first signal A and the second signal B. As shown in FIG. 5, since the phase difference between the first signal A and the second signal B is 90 degrees, a quadrupled frequency pulse signal C can be generated, and the number of quadrupled frequency pulse signals C can be counted by the DMA 110.

The microprocessor 100 can set the first timer 420 to calculate the time duration of each pulse signal, prompting the DMA 110 to store the time durations in a loop. The length of the DMA 110 is equal to the total number of pulses $P_T$ generated by one turn of the disc 140. When the second timer 430 starts to time, the initial count value N0 is recorded in the DMA 110, followed by the ending count value N1 at the end of the timing period. The number of complete pulses during the timing period Tc is given by m=N1-N0-2. By summing all the pulse periods from N0+2 to N1 memory segments, the elapsed time duration Td of m pulses can be obtained, and the microprocessor 100 uses pulse number m, the elapsed time duration Td of the m pulses and total pulse number $P_1$ in one turn of the disc 140 to generate the rotational speed $$\omega = \frac{60 \times m}{Td \times P_T} \text{ rpm}$$

of the disc 140.

Consider the embodiment in FIG. 5, when the second timer 430 starts to enter the timing cycle, the microprocessor 100 sets N0 to 1, and the DMA 110 continues to record the corresponding pulse time duration in the cycle of the second timer 430. Consequently, the pulse time durations are correspondingly recorded in the access units p2, p3, p4 . . . , m+3, m+4 of the DMA 110. Since the pulse time duration corresponding to the access unit p2 occurs before the second timer 430 starts timing, the pulse time duration stored in the access unit p2 is discarded when calculating the elapsed time duration Td. In addition, since the pulse time duration corresponding to the access unit m+4 has not been recorded before the timing period of the second timer 430 ends, when calculating the elapsed time duration Td, the pulse time duration corresponding to the access unit m+4 would not be recorded. Thus N1=m+3.

Therefore, when calculating the number of pulses m where m=N1-N0-2, the microprocessor 100 adds up the pulse time durations recorded in the access units from p3 to m+3 of the DMA 110 to obtain the elapsed time duration Td. The microprocessor 100 can then generate the rotational speed $$\omega = \frac{60 \times m}{Td \times P_T} \text{ rpm}$$

of the disc 140 according to the pulse number m, the elapsed time duration Td, and the total pulse number $P_T$ generated by one turn of the disc 140.

Figure 6:
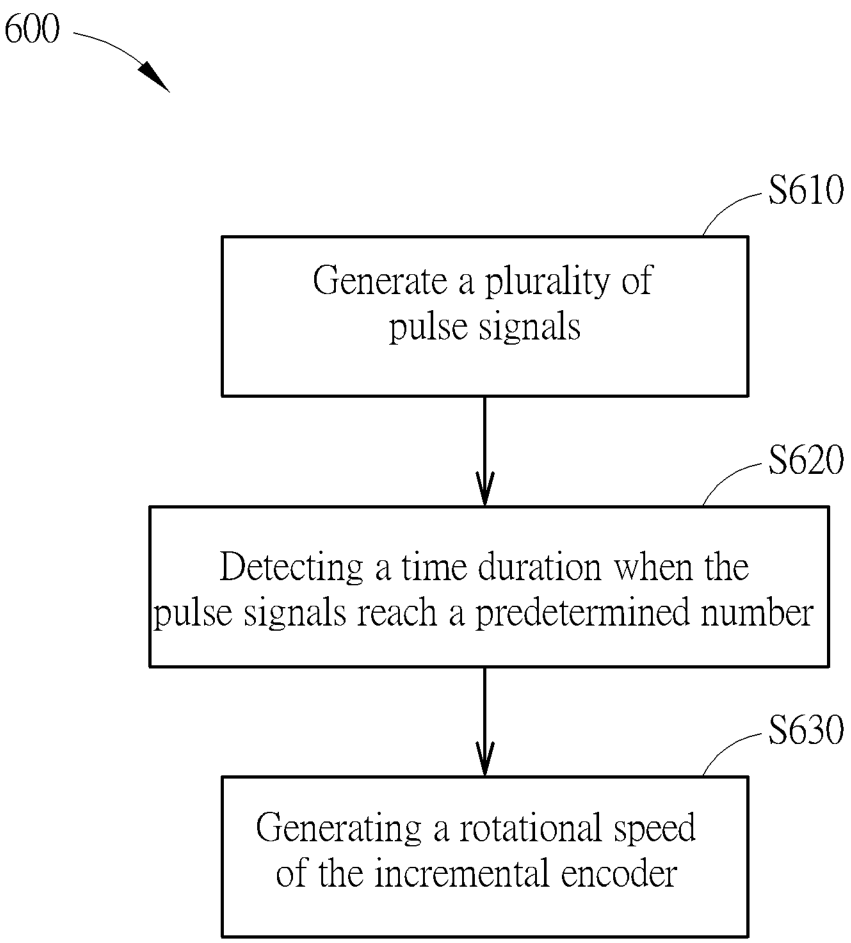
FIG. 6 is a flow chart of a method for estimating a rotational speed of an incremental encoder according to an embodiment of the present invention.

FIG. 6 is a flow chart of the method 600 for estimating the rotational speed of the incremental encoder 10 according to an embodiment of the present invention. The estimating method 600 for the rotational speed of the incremental encoder 10 includes the following steps:

S610: Generate a plurality of pulse signals C according to the first signal A and the second signal B;

S620: Detect the elapsed time duration Td for the plurality of pulse signals C to reach a predetermined number ($P_r$–N–1); and

S630: Generate the rotational speed $$\omega = \frac{60 \times (P_r - N - 1)}{Td \times P_T} \text{ rpm}$$

of the disc 140 according to the predetermined number ($P_r$–N–1), elapsed time duration Td, and the total pulse number $P_T$ generated by one turn of the disc 140.

Figure 7:
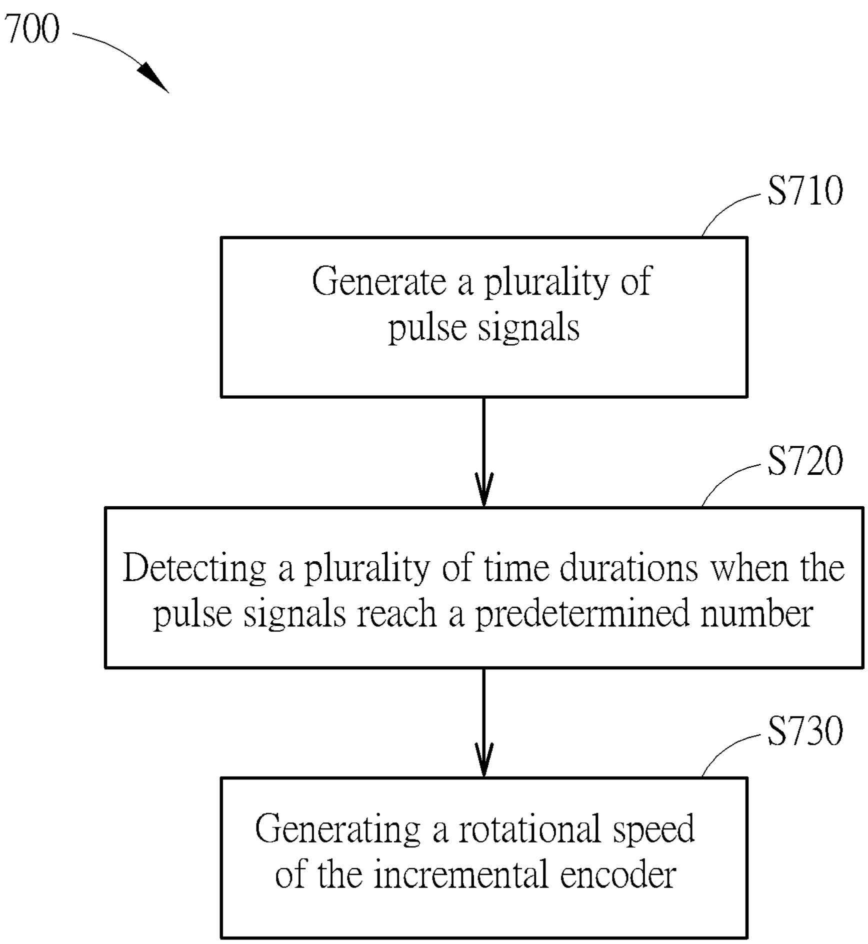
FIG. 7 is a flowchart of a method for estimating a rotational speed of an incremental encoder according to another embodiment of the present invention.

FIG. 7 is a flowchart of the method 700 for estimating the rotational speed of the incremental encoder 40 according to another embodiment of the present invention. The estimating method 700 for the rotational speed of the incremental encoder 40 includes the following steps:

S710: Generate a plurality of pulse signals C according to the first signal A and the second signal B;

S720: Detect a plurality of time durations (the sum of which is Td) for the plurality of pulse signals C to reach a predetermined number m=(N1-N0-2); and

S730: Generate the rotational speed $$\omega = \frac{60 \times m}{Td \times P_T} \text{ rpm}$$

of the disc 140 according to the predetermined number m=(N1-N0-2), the elapsed time duration Td, and the total pulse number $P_T$ generated by one turn of the disc 140.

In the embodiments of the present invention, the timer is used to calculate the exact elapsed time duration Td and the number of complete pulses, thereby addressing the issues of the traditional estimation method and satisfying both high-speed and low-speed applications. The embodiment of the present invention is not only applicable to the estimation of the speed/position of the disc 140, but can also be used for measuring and recording pulses and pulse intervals. In addition to generating a plurality of pulse signals through the first signal A and the second signal B, a plurality of pulse signals can be generated using more than two square wave signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotational speed estimation method for an incremental encoder, comprising:

generating a plurality of pulse signals according to a plurality of square waves;

detecting a time duration for the plurality of pulse signals to reach a predetermined number; and generating a rotational speed of the incremental encoder according to the predetermined number, the time duration, and a total pulse number generated by one rotation of a disc of the incremental encoder;

wherein generating the plurality of pulse signals according to the square waves comprises:

generating the plurality of pulse signals according to a first square wave and a second square wave, the second square wave having a same period as the first square wave, and a phase difference between the second square wave and the first square wave being 90 degrees; and when a level of one of the first square wave and the second square wave changes. outputting a pulse signal.

2. The method of claim 1, wherein detecting the time duration for the plurality of pulse signals to reach the predetermined number comprises:

using a direct memory access (DMA) to access a start time and an end time of generating the plurality of pulse signals.

3. The method of claim 2, wherein detecting the time duration for the plurality of pulse signals to reach the predetermined number further comprises:

generating the time duration based on the start time and the end time.

4. The method of claim 1, further comprising generating the predetermined number according to a pulse number of the pulse signals, and the number of rotations of the disc for generating the pulse number of the pulse signals.

5. The method of claim 1, further comprising generating the predetermined number according to a pulse number of the pulse signals, the number of rotations of the disc for generating the pulse number of the pulse signals, and a compensation value.

6. The method of claim 1, further comprising:

generating the square waves according to a plurality of light sources and a plurality of light sensors.

7. A rotational speed estimation method for an incremental encoder, comprising:

generating a plurality of pulse signals according to a plurality of square waves;

detecting a plurality of time durations for the plurality of pulse signals to reach a predetermined number; and generating a rotational speed of the incremental encoder according to the predetermined number, a sum of the time durations, and a total pulse number generated by one rotation of a disc of the incremental encoder;

wherein generating the plurality of pulse signals according to the square waves comprises:

generating the plurality of pulse signals according to a first square wave and a second square wave, the second square wave having a same period as the first square wave, and a phase difference between the second square wave and the first square wave being 90 degrees; and when a level of one of the first square wave and the second square wave changes, outputting a pulse signal.

8. The method of claim 7, further comprising:

generating the square waves according to a plurality of light sources and a plurality of light sensors.

9. The method of claim 7, further comprising:

accessing the plurality of time durations using a plurality of direct memory accesses (DMA).

10. The method of claim 7, further comprising summing the plurality of time durations to generate the sum of the time durations.

* * * * *